(12) United States Patent
Shanton (10) Patent No.: US 7,672,872 B2
(45) Date of Patent: Mar. 2, 2010

(54) POINT-OF-PURCHASE DISPLAY WITH RFID INVENTORY CONTROL

(75) Inventor: Kenneth Shanton, West Chicago, IL (US)

(73) Assignee: Smurfit-Stone Container Enterprises, Inc., Chicago, IL (US)

( * ) Notice: Subject to any disclaimer, the term of this patent is extended or adjusted under 35 U.S.C. 154(b) by 1002 days.

(21) Appl. No.: 10/646,912

(22) Filed: Aug. 22, 2003

(65) Prior Publication Data

US 2005/0040934 A1 Feb. 24, 2005

(51) Int. Cl.
*G06G 1/14* (2006.01)
*G06Q 20/00* (2006.01)

(52) U.S. Cl. .............................. 705/22; 705/28; 345/1.2; 340/5.92

(58) Field of Classification Search .................... 705/28, 705/416, 23; 340/572; 160/135
See application file for complete search history.

(56) References Cited

U.S. PATENT DOCUMENTS

| | | | |
|---|---|---|---|
| 4,821,291 A | 4/1989 | Stevens et al. ................. | 375/37 |
| 4,879,756 A | 11/1989 | Stevens et al. ................. | 455/39 |
| 4,937,586 A | 6/1990 | Stevens et al. .............. | 343/702 |
| 5,407,050 A | 4/1995 | Takemoto et al. ........... | 194/205 |
| 5,530,702 A * | 6/1996 | Palmer et al. ................ | 370/445 |
| 5,548,282 A | 8/1996 | Escritt et al. ................. | 340/825 |
| 5,583,525 A | 12/1996 | Nekomoto et al. ............. | 345/2 |
| 5,671,362 A | 9/1997 | Cowe et al. .................. | 395/228 |
| 5,715,622 A | 2/1998 | Giordano, Jr. ............ | 40/661.03 |
| 5,735,742 A | 4/1998 | French ......................... | 463/25 |
| 5,920,261 A | 7/1999 | Hughes et al. ............... | 340/572 |
| 5,930,766 A | 7/1999 | Gibb ........................... | 705/15 |
| 5,936,527 A | 8/1999 | Isaacman et al. ......... | 340/572.1 |
| 5,949,335 A | 9/1999 | Maynard .................. | 340/572.1 |

(Continued)

FOREIGN PATENT DOCUMENTS

EP 1 141 886 B1 9/2002

(Continued)

OTHER PUBLICATIONS

"Wal-Mart leading RFID charge; Bar code successor seen speeding broad range of retail operations" by John Cox, published Jun. 16, 2003.*

*Primary Examiner*—F. Zeender
*Assistant Examiner*—Luna Champagne
(74) *Attorney, Agent, or Firm*—Armstrong Teasdale LLP (57) ABSTRACT

A point-of-purchase ("POP") display employing RFID (Radio Frequency IDentification) technology for inventory control is provided. The POP is preferably fabricated from paper, paperboard and/or corrugated paperboard material, and incorporates one or more shelves and/or cover layers. An RF antenna structure is applied to the surfaces of, or built into, the one or more shelves and/or cover layers. Suitable RF transmitter/receiver circuitry may also be built into the POP, or the POP may simply have suitable connections built in, to permit such transceiver apparatus to be plugged into the POP. The transceiver circuitry is connected in any suitable manner to an inventory control computer, such as the retail store's computer. Each article that is to be displayed in the POP is provided with an RFID tag. Removal of an article from the POP, results in a signal being transmitted to the inventory control computer, corresponding to the removal of the article from the POP, and corresponding adjustment of the inventory records in the inventory control computer.

20 Claims, 7 Drawing Sheets

U.S. PATENT DOCUMENTS

| | | | | |
|---|---|---|---|---|
| 5,963,134 | A | 10/1999 | Bowers et al. | 340/572.1 |
| 5,977,875 | A | 11/1999 | Lin et al. | 340/570 |
| 6,014,078 | A | 1/2000 | Rojas et al. | 340/568.6 |
| 6,108,367 | A | 8/2000 | Herman et al. | 375/141 |
| 6,121,878 | A | 9/2000 | Brady et al. | 340/572.1 |
| 6,127,928 | A | 10/2000 | Issacman et al. | 340/572.1 |
| 6,155,325 | A * | 12/2000 | Schirer | 160/135 |
| 6,195,006 | B1 | 2/2001 | Bowers et al. | 340/572.1 |
| 6,198,391 | B1 | 3/2001 | De Volpi | 340/568.2 |
| 6,234,394 | B1 * | 5/2001 | Kahn et al. | 235/462.46 |
| 6,294,999 | B1 | 9/2001 | Yarin et al. | 340/573.1 |
| 6,323,782 | B1 | 11/2001 | Stephens et al. | 340/825.31 |
| 6,335,686 | B1 | 1/2002 | Goff et al. | 340/572.4 |
| 6,340,932 | B1 | 1/2002 | Rodgers et al. | 340/572.7 |
| 6,353,746 | B1 | 3/2002 | Javitt | 455/550 |
| 6,388,630 | B1 | 5/2002 | Kruger et al. | 343/767 |
| 6,392,544 | B1 | 5/2002 | Collins et al. | 340/572.7 |
| 6,394,290 | B1 * | 5/2002 | Walsh et al. | 211/149 |
| 6,419,154 | B1 | 7/2002 | Dalton et al. | 235/383 |
| 6,424,260 | B2 | 7/2002 | Maloney | 340/568.1 |
| 6,426,699 | B1 | 7/2002 | Porter | 340/568.1 |
| 6,448,886 | B2 | 9/2002 | Garber et al. | 340/10.1 |
| 6,473,047 | B2 | 10/2002 | Terashima et al. | 343/741 |
| 6,486,780 | B1 | 11/2002 | Garber et al. | 340/572.1 |
| 6,497,361 | B1 | 12/2002 | Mason | 235/383 |
| 6,502,012 | B1 | 12/2002 | Nelson | 700/236 |
| 6,539,280 | B1 | 3/2003 | Valiulis et al. | 700/236 |
| 6,546,795 | B1 * | 4/2003 | Dietz | 73/290 R |
| 6,552,663 | B2 | 4/2003 | Swartzel et al. | 340/572.1 |
| 6,576,334 | B2 | 6/2003 | Sakairi | 428/323 |
| 6,813,771 | B2 * | 11/2004 | Weaver | 720/600 |
| 6,816,125 | B2 * | 11/2004 | Kuhns et al. | 343/880 |
| 6,825,754 | B1 * | 11/2004 | Rolin | 340/10.34 |
| 7,044,373 | B1 * | 5/2006 | Garber et al. | 235/385 |
| 7,161,470 | B2 * | 1/2007 | Berquist et al. | 340/10.31 |
| 2002/0011967 | A1 | 1/2002 | Goff et al. | 343/895 |
| 2002/0014964 | A1 | 2/2002 | Okamura | 340/572.1 |
| 2002/0053735 | A1 | 5/2002 | Neuhaus et al. | 257/728 |
| 2002/0185747 | A1 | 12/2002 | Hashimoto | 257/778 |
| 2003/0061706 | A1 * | 4/2003 | Smeyak et al. | 29/601 |
| 2003/0151028 | A1 | 8/2003 | Lawrence et al. | 252/500 |
| 2003/0173247 | A1 * | 9/2003 | Boom Coburn et al. | 206/454 |

FOREIGN PATENT DOCUMENTS

| | | |
|---|---|---|
| EP | 1 172 759 B1 | 12/2002 |
| WO | WO 02/25825 A2 | 3/2002 |
| WO | WO 02/099764 A1 | 12/2002 |

* cited by examiner

POINT-OF-PURCHASE DISPLAY WITH RFID INVENTORY CONTROL

BACKGROUND OF THE INVENTION

1. The Technical Field

The present invention is directed to retail product shelving and point-of-purchase displays, in particular such shelving and display structures that are provided with inventory control devices.

2. The Prior Art

Point-of-purchase ("POP") displays for use in retail environments, are well known in the prior art. Such POP displays have been fabricated from metal, plastic, paper, paperboard and/or corrugated paperboard, and combinations thereof. In recent times, POP displays fabricated from paper, paperboard and/or corrugated paperboard have become particularly popular, in terms of weight, collapsibility, transportability, cost, and recyclability.

Traditional POP displays have required periodic physical inspection and monitoring, to ensure that the POP display is always filled with product and/or that the POP display, once it has served its purpose, is removed and disposed of in a suitable manner. It would be desirable to provide a way to reduce or eliminate the need for periodic physical, in-person, inspection of POP displays, so that the POP displays need to be visited only when it is known that the POP displays must be refilled or removed.

So-called "Smart Shelves" are known to exist, which are permanently installed (usually plastic or metal), hard-wired (to hide the wiring and electronics) structures.

In addition, shelves have been produced with are provided with electronic/radio controlled shelf labels. However, while the individual products may bear RFID tags, the transmitter/receivers that communicate with such tags are not in the shelves themselves, but are typically centrally located in or spatially distributed throughout the retail space, separate and apart from the shelve structures themselves.

The following references disclose various shelving and/or RFID product tracking and inventory control schemes.

Stevens et al., U.S. Pat. No. 4,821,291 discloses RF communications systems, specifically for RF based electronic shelf edge information displays. Stevens et al., U.S. Pat. No. 4,879,756. This is a division of the above '291 patent, and thus has the same disclosure.

Stevens et al., U.S. Pat. No. 4,937,586 discloses RF based electronic shelf edge information displays.

Takemoto et al., U.S. Pat. No. 5,407,050 discloses an article control system, with matrix sensors positioned on the upper surfaces of a display stand, that generate magnetic fields that interact with magnetic labels on articles placed on the stand.

Escritt et al., U.S. Pat. No. 5,548,282 discloses an electronic shelf edge price display system.

Nekomoto et al., U.S. Pat. No. 5,583,525 discloses an electronic shelf tag scheme.

Cowe et al., U.S. Pat. No. 5,671,362 discloses an inventory control system, incorporating shelves having arrays or grids of sensors thereon. Each shelf or group of shelves has an associated transmitter, for communicating to a remote location the status of the articles disposed on the shelves. The articles may include RFID labels.

Giordano, Jr., U.S. Pat. No. 5,715,622 discloses an electronic display module mounted on a shelf rail or a method of mounting such a display module.

French, U.S. Pat. No. 5,735,742 is directed to an RF-based gaming chip tracking system, in which RFID devices are embedded in the gaming chips.

Hughes et al., U.S. Pat. No. 5,920,261 is directed to an RFID based tracking system for a retail environment, incorporating a central transmitter, several widely spaced apart locating receivers, and individual tags on individual retail items. The system is capable of locating and providing an image of the tags on a two- or three-dimensional basis.

Issacman et al., U.S. Pat. No. 5,936,527 discloses a system for locating and tracking items, such as file folders in an office. Individual file folders are provided with RFID tags. Local exciters communicate with the tags, which in turn communicate with a main or host transmitter/computer.

Maynard, U.S. Pat. No. 5,949,335 is directed to RFID tagging systems for computer network assets.

Bowers et al., U.S. Pat. No. 5,963,134 is directed to an article (or library) inventory control system, including; 1) a storage area, an article return area, an interrogation zone and a collection bin; and/or 2) a mobile interrogator; and/or 3) first and second interrogators; and/or 4) video monitoring of a checkout area.

Lin et al., U.S. Pat. No. 5,977,875 discloses a file inventory control system, in which file folders are provided with RF responsive tags, responsive to a remote RF generator. The file drawers have visual indicators to assist in indicating that a file in that drawer is responding to a generated signal.

Rojas et al., U.S. Pat. No. 6,014,078 discloses a system for locating weight lifting implements, in which a rack is provided with individualized slots with RFID tags, that communicate with RFID tags on the weights. Misplacement of the weights produces an indication by a monitoring system in the form of a visible or audible signal.

Herman et al., U.S. Pat. No. 6,108,367 discloses a two way wireless communication system for shelf labels. The system incorporates one or more transceivers and a plurality of tag receivers/reflectors.

Brady et al., U.S. Pat. No. 6,121,878 is directed to an RFID tag-based system for controlling assets, such as articles for sale.

Issacman et al., U.S. Pat. No. 6,127,928 is a continuation of the aforementioned '527 patent and thus has the same disclosure.

Bowers et al., U.S. Pat. No. 6,195,006 B1 discloses an RFID tag based inventory system, such as for a library.

DeVolpi, U.S. Pat. No. 6,198,391 B1 discloses a retail security system, in which individual articles are secured to display racks with tags that must be severed or released to permit removal of the articles from the racks. The tags appear to be hard-wired electrical contacts.

Yarin et al., U.S. Pat. No. 6,294,999 B1 discloses a system for monitoring the removal and replacement of medicine containers in a medication distribution tray ("smart tray"). The containers are provided with electromagnetic tags. In addition, the tray has an RF array built into it. The tray can then communicate to remotely located appliances or a computer.

Stephens et al., U.S. Pat. No. 6,323,782 B1 is directed to an unattended item delivery system, incorporating an article to be transported which has a transponder associated with it; an enclosure having a locking mechanism, and a transponder that is connected to the locking mechanism and is capable of communicating with the article transponder. An external communications device or devices (at the sending and/or drop-off points) may be provided to externally actuate the locking mechanism. Additional surveillance and security features are also disclosed.

Goff et al., U.S. Pat. No. 6,335,686 B1 discloses antenna shelf tape for use with items having RFID tags or labels. Although focused on use in libraries, the reference suggests the use of the invention in stores, warehouses, etc.

Rodgers et al., U.S. Pat. No. 6,340,932 discloses a carrier with antenna for RFID identification, in which a plurality of objects having RFID tags can be placed in the carrier, which itself is then passed through a passage lined with further antennas, that forms the actual reader. The antenna in the carrier is intended to improve interrogation and response performance, as well as to potentially provide for the capacity to locate individual articles within the carrier.

Goff et al., U.S. Pub. 2002/0011967. This published application is a divisional application of Goff et al., U.S. Pat. No. 6,335,686 B1, and thus has the same disclosure.

Okamura, U.S. Pub. 2002/0014964 discloses the use of electronic tags mounted in a floor, and a movable reader, for addressing storage and inventory issues in a warehouse or storage environment.

Javitt, U.S. Pat. No. 6,353,746 is directed to a method and apparatus for improving signal quality in an electronic shelf label scheme.

Kruger et al., U.S. Pat. No. 6,388,630 is directed to a waveguide structure for facilitating the interrogation of individually RFID tagged articles that are stacked on shelves or pallets or the like.

Collins et al., U.S. Pat. No. 6,392,544 is directed to a shelf inventory apparatus and method, in which antennae are placed on the shelf surfaces, and individual articles are provided with RFID tags. The material and/or manner of construction of the shelves are not specified. The antennas may be fabricated from conductive ink.

Dalton et al., U.S. Pat. No. 6,419,154 discloses an electronic shelf label system, incorporating a main transmitter, a plurality of relay units (antennae) that split the initial signal, and the labels themselves.

Maloney, U.S. Pat. No. 6,424,260 is directed to a mobile object tracking system, such as a key tracking system, including racks for holding individual objects that may be tagged, and an enclosure which monitors the removal and return of the objects and/or the racks.

Porter, U.S. Pat. No. 6,426,699 is directed to a collapsible storage device for the delivery and pickup of goods. The device includes communication equipment to control access to the device, and to provide notification, to a remote location of delivery to or pickup from the device.

Garber et al., U.S. Pat. No. 6,448,886 B2 is directed to RFID applications, in particular for libraries.

Terashima et al., U.S. Pat. No. 6,473,047 B1 is directed to a method for inventory control of library books, in which individual books bear RFID labels, and are passed through an antenna loop formed in an open-topped box.

Garber et al., U.S. Pat. No. 6,486,780 B1 is directed to RFID applications, in particular for libraries.

Mason, U.S. Pat. No. 6,497,361 is directed to electronic article surveillance (EAS) methods and apparatus, specifically in the environment of a retail self-checkout system.

Nelson, U.S. Pat. No. 6,502,012 is directed to a newspaper rack that monitors the quantity of papers in it, and is provided with the capability of wirelessly transmitting a signal, when servicing is required.

Valiulis et al., U.S. Pat. No. 6,539,280 B1 discloses merchandise display racks, including tracks for linearly arranging articles having individual RFID tags. The antennae for receiving signals from the tags are permanently mounted in the store, remote from the racks, or are in hand-held units.

Swartzel et al., U.S. Pat. No. 6,552,663 is directed to an electronic product information display system (electronic shelf labels).

In existing retail shelving that has been provided with RFID technology, the shelving is usually intended for permanent installation with its attendant cost, weight, and generally low recyclability. The existing approach is to attempt to integrate the electronics and wiring into conventional shelving displays, which may be time consuming, involving the dismantling of the shelving, inconvenience to the retailer/wholesaler, etc.

Companies that have provided RFID shelf inventory control systems in the past include SAMSys Technologies, Inc., 44 East Beaver Creek Road, Unit 11, Richmond Hill, Ontario, Canada L4B 1Gb; TAGSYS, 180 Chemin de Saint Lambert, 13821 La Penne sur Huveaunne, France; and Lloyd, Gerstner & Partners, Montvale, N.J. Some portable display systems have been demonstrated, such as by TAGsys.

It would be desirable to provide a low-cost point-of-purchase display that is provided with RFID technology so that it can be supplied in a ready to use condition to a retailer/wholesaler.

It would be desirable to provide such a point-of-purchase display that is fabricated from paper, paperboard, and/or corrugated paperboard.

These and other desirable characteristics of the present invention will become apparent in view of the present specification, including claims, and drawings.

SUMMARY OF THE INVENTION

The present invention is directed to a system for monitoring inventory in a point of purchase display. The system comprises a portable display stand, having at least one shelf, operably configured to support a package thereon. The display stand further has at least one of a bottom wall, a side wall, a back wall, a top wall, a front wall. At least one package is operably configured to be positioned on the at least one shelf. The at least one package contains a radio frequency identification tag. At least one radio frequency antenna is affixed to at least one of the at least one shelf, the at least one of a bottom wall, a side wall, a back wall, a top wall, a front wall. A radio frequency identification tag reader is operably connected to the radio frequency antenna, for transmitting to and receiving radio frequency signals from the radio frequency identification tag, the radio frequency identification tag reader being operably configured to generate signals representative of the presence and absence of radio frequency identification tags within the display stand. The radio frequency identification tag reader is operably connectable to a remotely situated monitoring apparatus, for providing a remote indication of the presence and absence of the at least one package containing a radio frequency identification tag, within the display.

In a preferred embodiment of the invention, the portable display stand is configured to be readily collapsible and transportable. Preferably, the portable display stand is fabricated substantially completely from one of: paper; paperboard; corrugated paperboard; bristol board; foam cored board; plastic.

In a preferred embodiment of the invention, the portable display stand is at least partially covered with emf absorbing/shielding material.

The at least one radio frequency antenna may be affixed to the portable display stand by printing the at least one radio frequency antenna on a surface of the portable display stand with metallic ink. Alternatively, the at least one radio frequency antenna is embedded within the material from which the portable display stand is fabricated.

The portable display stand may be provided with wheels to facilitate movement of the portable display stand. In an alternative embodiment, the portable display stand may incorporate a pallet structure.

DETAILED DESCRIPTION OF THE INVENTION

While this invention is susceptible of embodiment in many different forms, there is shown in the drawings and will be described in detail several specific embodiments, with the understanding that the present disclosure is to be considered an exemplification of the principles of the invention and is not intended to limit the invention to the embodiments illustrated.

The "Smart Display" invention, as disclosed to us, comprises a point-of-purchase ("POP") display, which incorporates RFID (Radio Frequency Identification) technology for purposes of inventory control. A point-of-purchase display will be provided with an embedded antenna, and associated circuitry (the interrogation source), which interacts with RFID labels disposed on individual packages that are to be displayed in the POP display. Some of the interrogation circuitry may be hardwired into the POP structure; alternatively, some of it may be plugged-in to the POP display, once it has been erected in place in a store. The POP display's interrogation circuitry can then be connected to a monitoring apparatus, such as a computer in the store. The POP display circuitry may be set up to continuously interrogate the labels in the packages in the display, to maintain a running inventory. When a package has been removed from the display, beyond the limited transmission range of the RFID label, then the running inventory will be decreased by one, and communicated to the store's inventory computer.

According to a preferred embodiment of the invention, the POP may be fabricated from corrugated paperboard material, which has been pre-"wired" to accept RFID electronics. Alternative POP constructions could be fabricated from any suitable low-density display board material, such as foam cored board (e.g., a central layer of polystyrene foam laminated between layers of, typically, white paper). Another alternative material is formed from a central layer of paper honeycomb material, laminated between layers of paper or bristol board. Such material has been marketed by Conservation by Design Limited under the mark Tycore. This is advantageous over the design of conventional "smart shelves" which have been fabricated from metal, which can cause interference with RF signals, or the detuning of antennas if accidental contact is made. Detuning of an antenna can also occur if the antenna coil of the RFID tag is in close proximity with a metal (e.g., aluminum foil or metal shelving) without actually being in physical contact with the metal.

Figure 1:
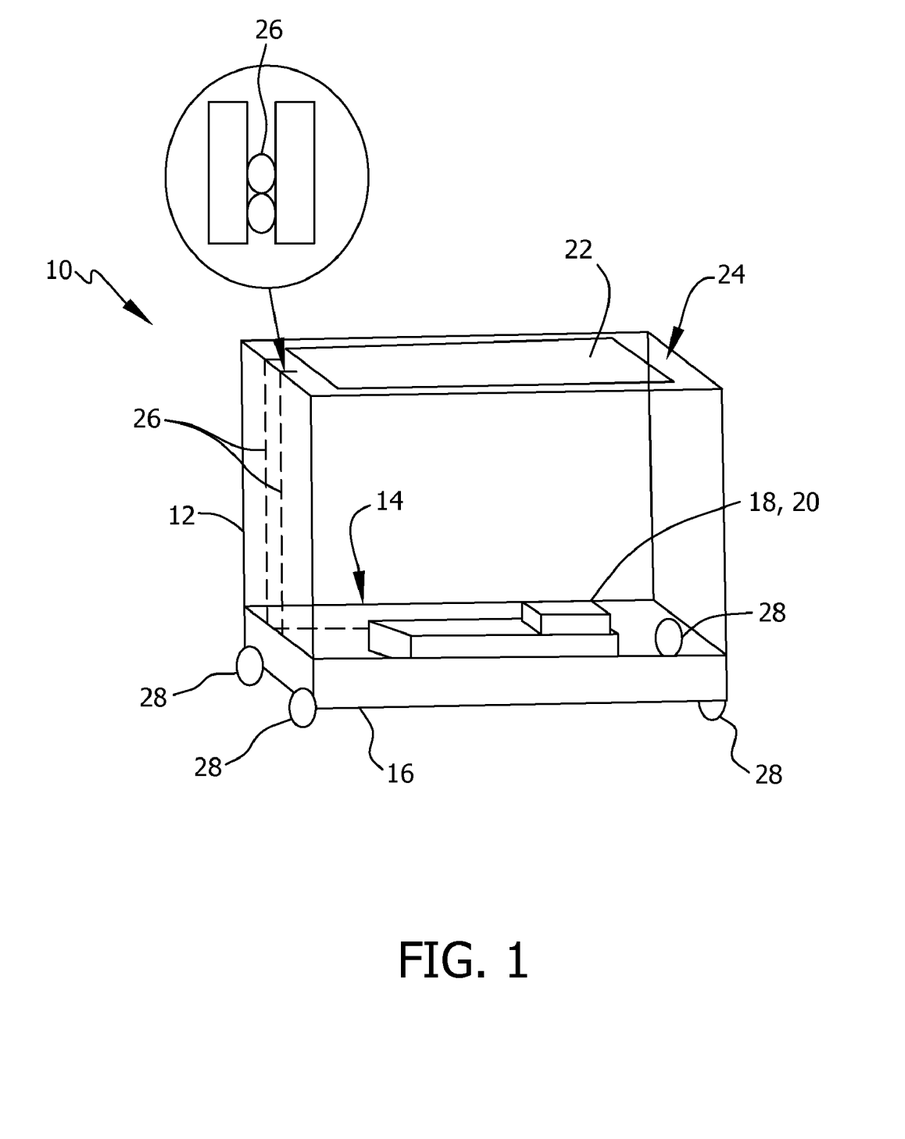
FIG. 1 is a schematic view of a POP display with RFID inventory control, according to a preferred embodiment of the invention.

FIG. 1 is a simplified or schematic view of a POP with RFID inventory control, according to a preferred embodiment of the invention. In its simplest execution, point-of-purchase display 10 is an open-fronted rectangular parallelepiped display 12 (the front wall of which may be in place during shipment, and removable upon arrival at its destination). Single shelf 14 is spaced above the bottom 16 of the display 12 to enable the accommodation of the RF reader 18 and electrical connections 20. The reader is the device containing the digital electronics which extract and separate the identification information from other data, received in a reply signal from the tag or label, which is placed on the package or packages being stored on the display. The digital electronics perform the actual reading function. Generally speaking, the read electronics may also interface to a display and/or provide a parallel or serial communications interface to a host computer or industrial controller. The tag (or label) is the transmitter/receiver pair ("transceiver") plus the information storage mechanism that is attached to the object being tracked. Alternative terms include transponder, electronic label, code plate, etc. For the purposes of this application, the terms tag and label may be used and should be considered interchangeable. Such reader and tag devices are well known in the art of radio frequency identification and a wide variety of such devices are commercially available. Specific examples of each, that may be employed in the system of the present invention, are discussed herein, but it is understood that depending upon the requirements of any particular application of the present invention, other devices may be readily identified and selected by one of ordinary skill in the art, having the present disclosure before them.

Reader 18 and electrical connections 20 may be built into display 12. Alternatively, reader 18 and electrical connections 20 may be plug-in devices that will be separately provided. The electronics that are resident in the POP display 10 may be powered by AC or DC (via batteries housed in the recess between the bottom and the lowermost shelf along with the reader and electrical connections).

Antenna 22 may be positioned in the top 24 of display 12 (although it may be positioned in shelf 14, or in each of such other shelves 14 as may be provided. Antenna 22 will be connected to reader 18 and electrical connections 20 by wires 26, which, like antenna 22, may be embedded within the material from which display 12 is fabricated, such as between juxtaposed layers of foam core, paperboard or corrugated paperboard as shown in the inset (a sectional view from above), or, for example, between the layers of linerboard of a single layer of single wall corrugated paperboard (within the flutes of the corrugated layer). The antenna configuration may be in the form of a simple loop, as shown. Alternatively, numerous other alternative antenna configurations may be employed. Antenna design considerations are discussed at length in "HF Antenna Cookbook Technical Application Report", published by Texas Instruments, Publication No. 11-03-26-001, in March, 2001; and "A Study of Factors Affecting the Design of EPC Antennas & Readers for Supermarket Shelves", published by Auto-ID Centre, Jun. 1, 2002, Auto-ID Center Report WH001; the complete disclosures of which are incorporated herein by reference.

Corrugated paperboard material is a preferred material for the display, specifically "B" flute, as it is known in the corrugated paperboard industry, as being potentially the most versatile material for the contemplated uses of the invention. Of course, dependent upon the physical performance requirements, greater or lesser sizes of flute, and double or triple wall corrugated may be used. Special performance materials, such as high wet strength or "high test" corrugated board, or even plastic corrugated material can be used where water may be present and high strength is required. Various types and styles of material may be used for forming the display, as would be well known to one of ordinary skill in the art of fabricating collapsible and/or light-weight point-o-purchase displays.

An emf (electromagnetic field) absorbing material may be applied to a part or all of the surfaces of the POP display, to reduce or eliminate interference from adjacent FR sources or other nearby electronic equipment, as well as to improve the performance of the antenna and reduce undesirable reflections from objects and devices (such as the interference caused by iron reinforcing rods in concrete structures as was experienced during tests as described herein). Examples of such materials are Staticveil Conductive Paint and Super Shield aerosol spray, both obtainable from Less EMF Inc. of Ghent, N.Y., which materials while designed for adhesion to plastics, are readily adhered to paperboard materials. Metallic foils, e.g., aluminum, can be applied selectively or to all surfaces to either reduce electromagnetic interference ("emi") and/or enhance graphic visual appeal of the display. Tests conducted to determine performance of the displays resulted in the finding that metal reinforcing bars in concrete floors could interact with antenna fields to interfere with the reading of tags on lower shelves of test displays. Movement of the shelves (to change positioning relative to the rebar in the floor) enabled effective readings to be made. Shielding is not only important vis-à-vis accommodating the reinforcing rods in concrete, but also with respect to adjacent metallic shelves, shelves containing metal cans or metal foil packages, etc. Accordingly, it is believed that emf shielding/absorbing material should be used on displays in accordance with the present invention, unless the location of use of the displays is known to be free of emf sources and/or can otherwise be controlled. Emf shielding can be accomplished by a variety of known techniques available to those of ordinary skill in the art. There are many considerations which guide the choice of what shielding or absorbent materials may be used, including whether or not the application (the antenna) will be in a free and open space or in an enclosed volume; the frequencies at which the tags and transponders will be operating, and the permissible thickness of the absorbent material that can be applied to the display surfaces. These considerations would be readily recognized and addressed by one of ordinary skill in the art of RFID technology, having the present disclosure before them.

The antenna and "wiring" leads from the antenna to the reader may be printed on (metallic ink), or adhesively affixed (e.g., by a self-adhesive backing) to, the surfaces of the shelves or other planar surfaces of the point-of-purchase display, to facilitate the disposability/recyclability of the point-of-purchase display.

In alternative embodiments of the invention, such as shown in FIGS. 2-5, two or more shelves may be provided in the display, and the form of the display and the plan forms of the shelves may be altered from the rectangular parallelepiped construction of FIG. 1, to any suitable desired configuration, as the inventive concept of RFID inventory control may be applied to any lightweight collapsible POP display, in accordance with the principles of the present invention. Each shelf may be provided with its own reader and/or antenna. In addition, the provision of multiple antennas on the shelves, and/or multiple antennas, e.g., in the side walls of the display, may be provided to enable spatial resolution (i.e., precise placement of individual specific tagged products on the shelf or shelves).

Each of the products (not shown) that are to be stored and displayed in POP display 10 will be provided with an RFID tag, that is capable of receiving and responding passively (energized only by the signal received from the antenna) or actively (self-powered, e.g., by battery), to RF signals generated by reader 18 and emitted via antenna 26.

In preferred embodiments of the invention, the products may be packed into the point of purchase display and the prepackaged display shipped to the destination retailer/wholesaler for convenience. Alternatively, and depending upon the configuration of display 12, it may be distributed in a folded flat configuration, to be erected later at the display location and then filled with product. Display 12 may be provided with easily insertable wheels or rollers 28 (such as are well known in the art), for ready mobility in the retail/wholesale environment, for optimum display positioning. Alternatively, POP display 12 may be mounted upon a shipping pallet, such as, for example, a Cordeck® brand corrugated paperboard pallet, supplied by Smurfit-Stone Container Corporation of Chicago, Ill.

POP display 10 may be configured to incorporate a self-contained computer that is connected to reader 18, to record the removal of products (not shown) from POP display 10. This information may be retained within the display computer, or broadcast, via wire or wirelessly, to a remote location, for marketing purposes. The reader, electrical connections, and on-board computer (if provided) may be connected in a real-time manner to a monitoring apparatus such as the retail/wholesale store computer; alternatively, a wireless or wired connection may be provided to bypass the store computer, to be independent of the store computer infrastructure.

Figure 2:
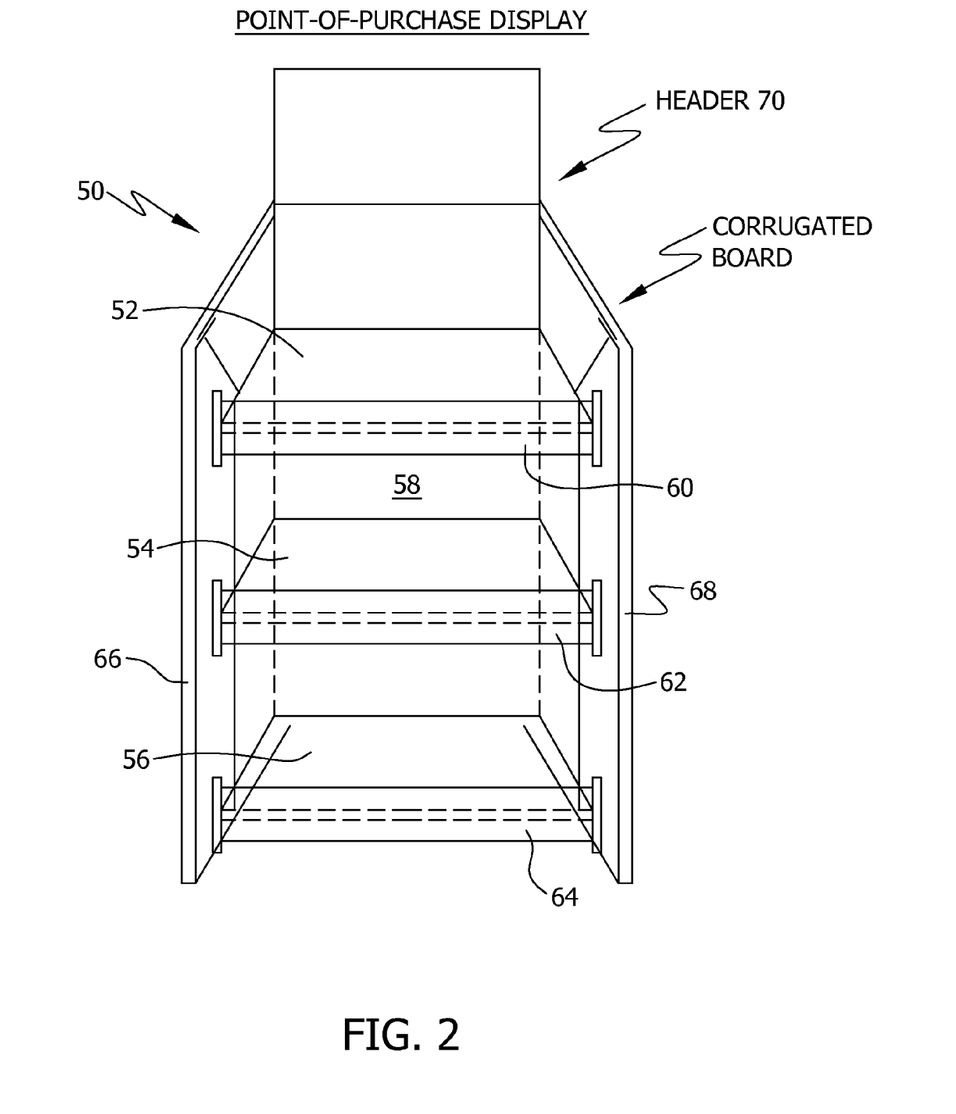
FIG. 2 is a front view of a POP display which may be provided with RFID inventory control, according to the principles of the invention.

FIG. 2 is a front, simplified view of a POP display which may be provided with RFID inventory control, according to the principles of the invention. POP display 50 is, again, preferably fabricated substantially completely, or in whole, from corrugated paperboard material. POP display 50 incorporates, in the illustrated embodiment, three shelves 52-56, each of which may be hinged to back wall 58, and supported at their respective front edges by shelf supports 60-64, which may be formed from panels struck from the back wall 58 and side walls 66, 68, or which may be separate members inserted into slots (not shown) into side walls 66, 68. POP display 50 may also include upstanding header 70 which may bear advertising or other indicia.

Figure 3:
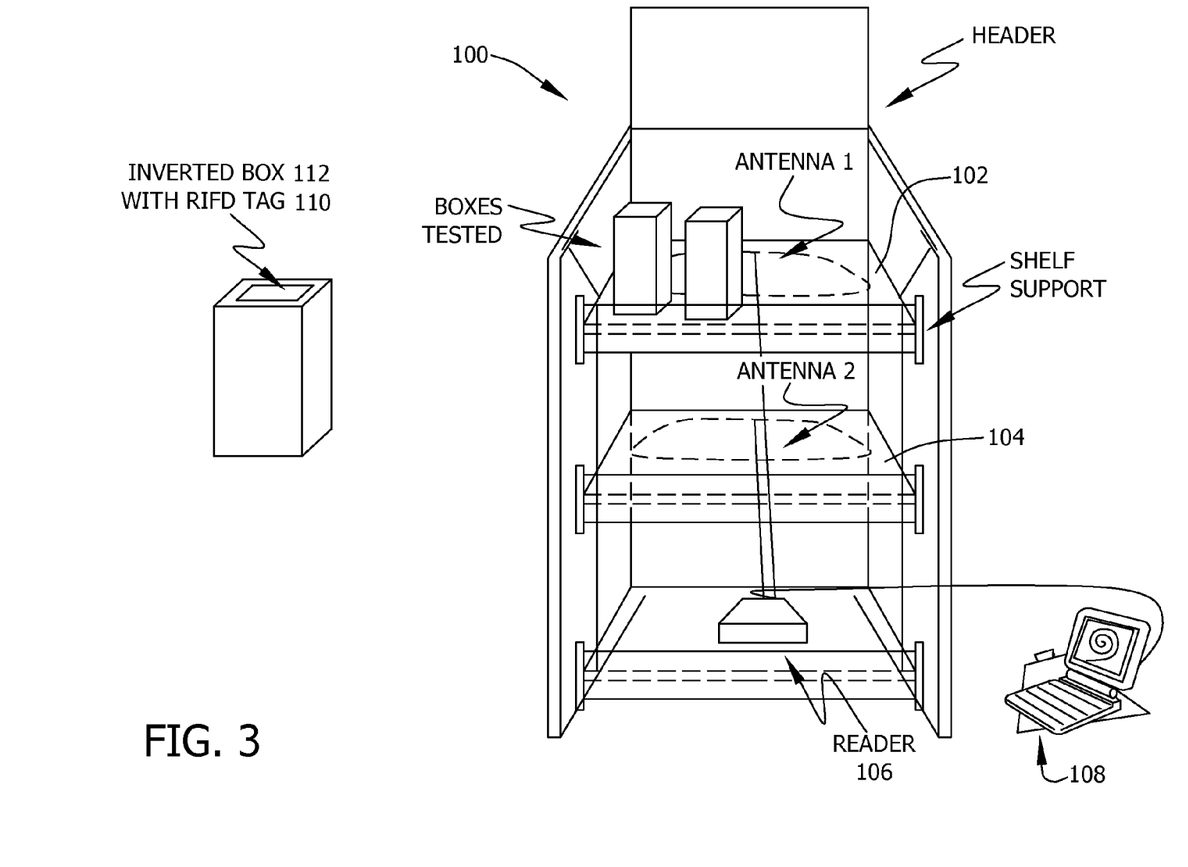
FIG. 3 is a front view of the POP display of FIG. 2, which has been modified to incorporate the RFID inventory control, according to one embodiment of the present invention.

FIG. 3 is a front, simplified view of a POP display such as shown in FIG. 2, which was been modified to incorporate the RFID inventory control, according to one embodiment of the present invention. An actual POP display 100 was fabricated, using RG 58 coaxial cable (50 ohm) loop antennae (Antenna 1 and Antenna 2) attached to the underside of two shelves 102, 104, as shown. These antennae were connected with a reader 106 (a SARS MP9210 13.56 MHz Proximity Reader) supplied by SAMSys of Toronto, ON, Canada, and then to a monitoring device, computer display 108. A conventional coaxial cable splitter/combiner was used to combine the two antennas.

Figures 7, 7A:
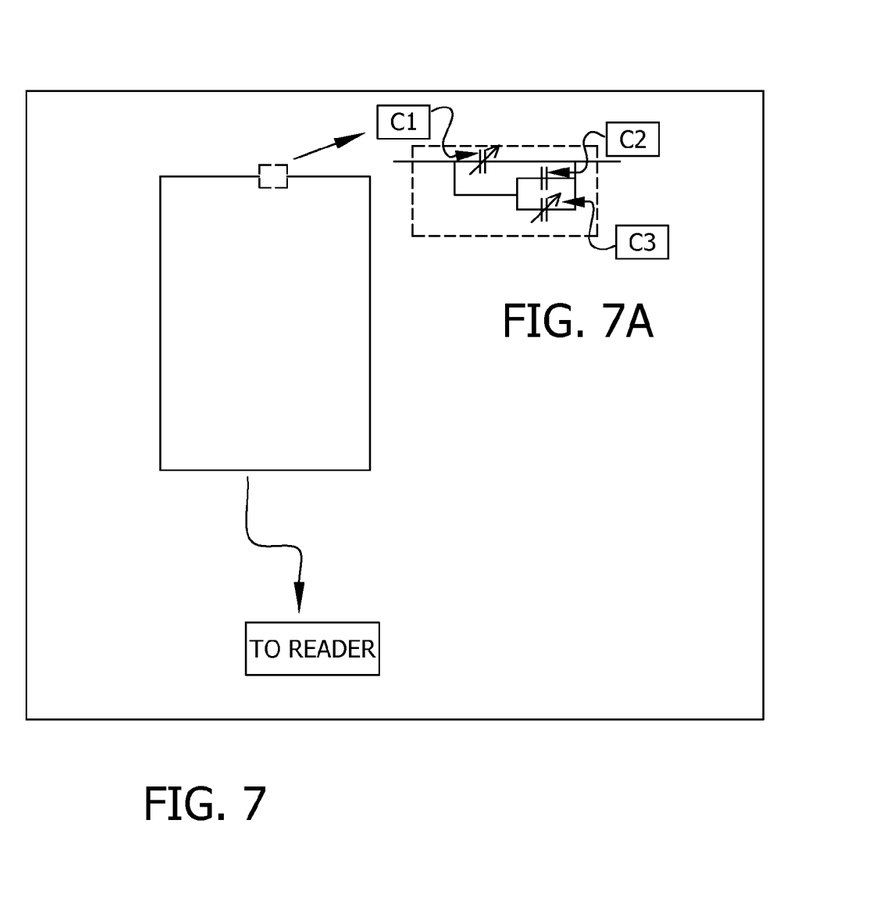
FIG. 7 is a plan view of an antenna incorporating a tuning circuit.
FIG. 7A is a schematic of a representative tuning circuit for use with an antenna according to the principles of the present invention.

In order to achieve the desired read range on the shelf, it is preferable to tune the antenna to the resonant frequency of the integrated circuit in the tag or label on the products. This may be accomplished by placing a tuning circuit into the antenna loop, as shown in FIG. 7. The tuning circuit preferably is comprised of three capacitors as shown in FIG. 7a. C1 and C3 are preferably variable capacitors (typically 4-40 pF) and C2 is preferably a fixed capacitor (typically 47 pF).

One or more tags or "smart labels" 110, supplied by SAM-Sys, were attached to the inside of boxes 112, which were placed on shelf 102. Each label 110 was fabricated of an ISO 15693 compatible I-CODE "Smart Label" containing an SLI chip from Philips Semiconductors, Gratkorn that was attached to a copper antenna coil on a polyester film substrate. Further information on the IC is available in the document "I-CODE SLI Smart Label ICSL2 ICS20 Functional Specification" Revision 3 Jan. 2003, published by Philips Semiconductors, the content of which is incorporated herein by reference. The arrival of the boxes 112 on the shelf 102 were recorded on the display 108 and their presence was indicated while stationary. When the package was removed from the shelf, the identity was no longer displayed on the computer display. In a first test, a small number of packages were placed on the shelf and successfully monitored; thereafter, tests with more than ten packages have been successfully monitored.

Figure 4:
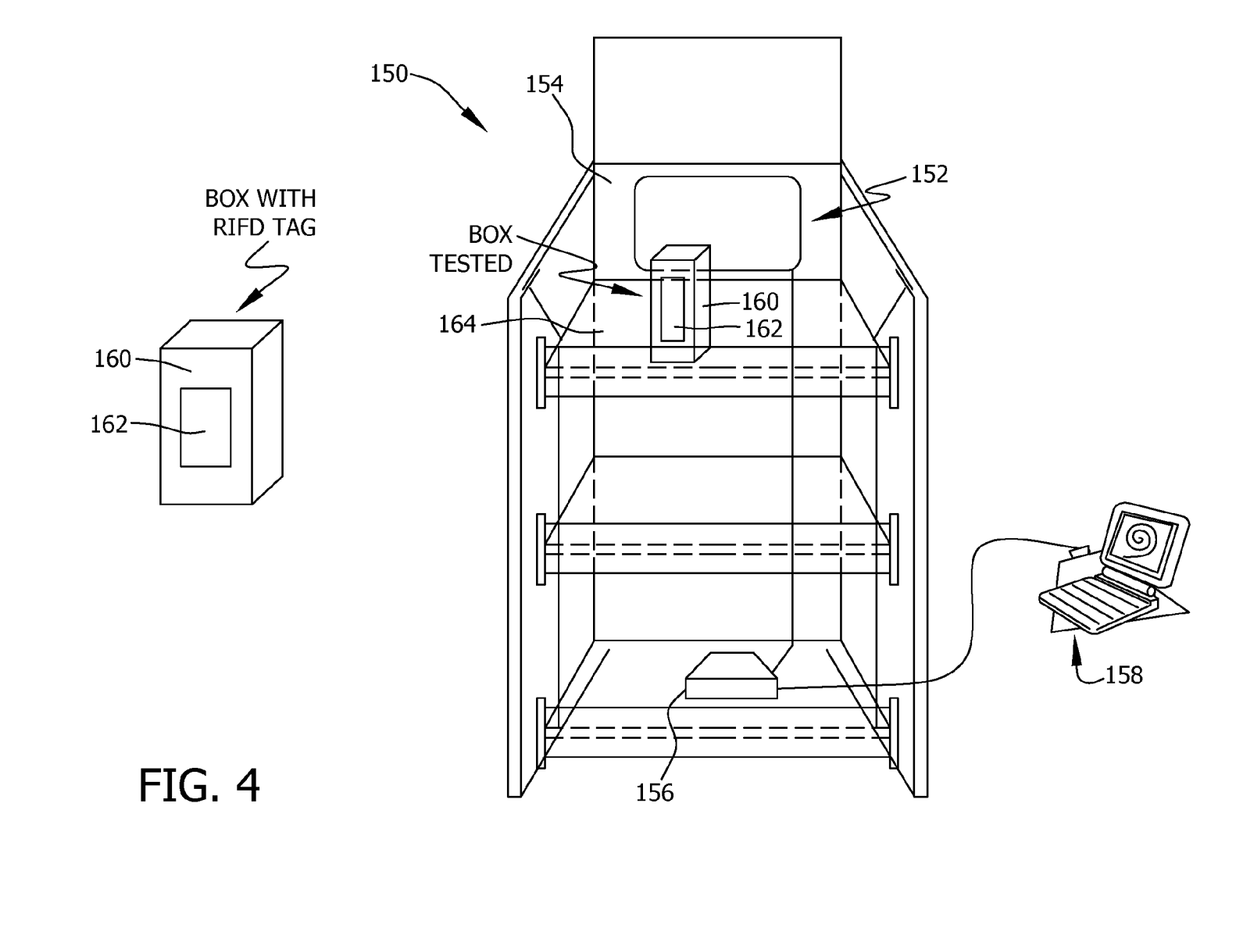
FIG. 4 is a front view of the POP display of FIG. 2, which has been modified to incorporate the RFID inventory control, according to another embodiment of the present invention.

FIG. 4 is a front, simplified view of a POP display, such as that shown in FIG. 2, which was been modified to incorporate the RFID inventory control, according to another embodiment of the present invention. POP display 150 included antenna 152, placed on back wall 154 of display 150. Antenna 152 was a commercial unit model ATP-1111, supplied by Snyder Electronics of Altadena, Calif. The reader 156, a Tag-it™ Series 320 reader, supplied by Texas Instruments, was connected to computer display 158. Again, a box 160 was provided with a tag or label 162 (such as a Tag-it™ HF Transponder Inlay-Strip RI-I14-110A), box which was placed on shelf 164, and its placement and stationary presence were sensed and indicated on display 158.

Figure 5:
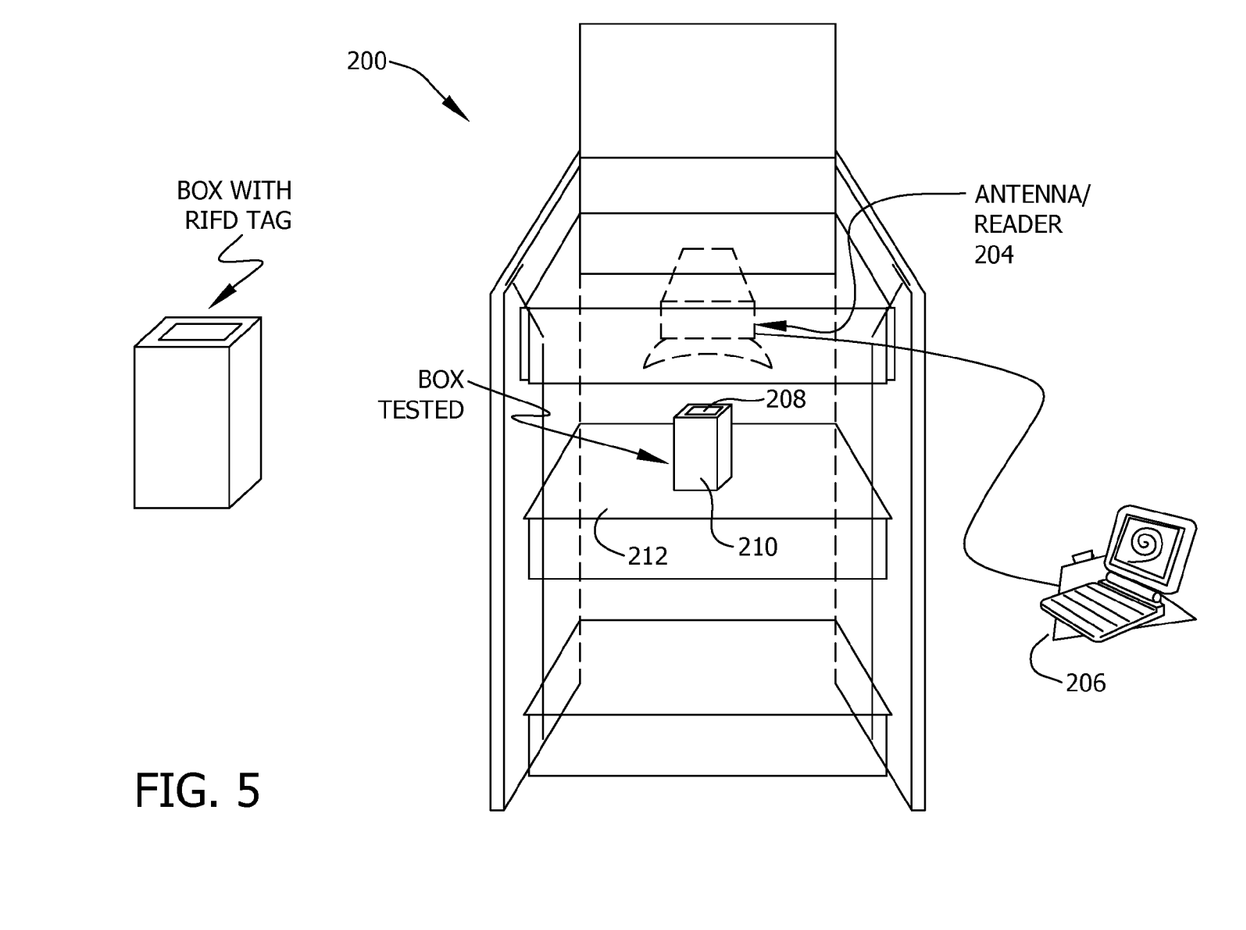
FIG. 5 is a front view of the POP display of FIG. 2, which has been modified to incorporate the RFID inventory control, according to another embodiment of the present invention.

FIG. 5 is a front, simplified view of a POP display, which has been modified to incorporate the RFID inventory control, according to another embodiment of the present invention. POP display 200 was provided with a combined antenna/reader 204. The antenna portion of antenna/reader 204 was a model (SL RC400) I-Code from Philips Semiconductors, of Gratkorn, Austria, connected to a Philips SLEV 400 reader, in turn, connected to a notebook computer 206 running Philips SLEV 400 Demo software. A tag or label 208 (using an I-Code SLI Smart Label IC from Philips Semiconductors) was applied to a box 210. Box 210 was placed on shelf 212, below antenna/reader 204, and again, its placement and stationary presence were sensed and indicated on display 206. The identity number of the IC was changed using the software for the Philips SLEV 400 reader. This demonstrated that information on the "smart label" can be changed in situ and the new identity can be read.

Figure 6A:
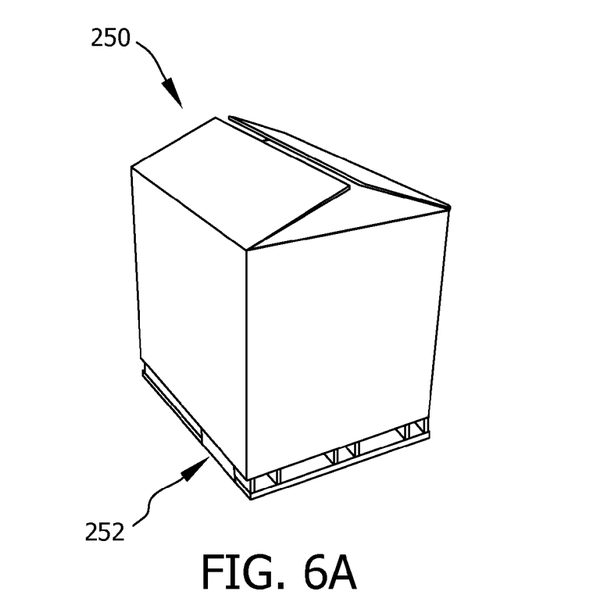
FIG. 6A is a perspective view of a POP display, such as may be used in retail environments, such as bulk "shopping clubs", in which a bulk bin, typically incorporating a supporting pallet structure, is simply opened on the front or top to enable access to the product therein.
Figure 6B:
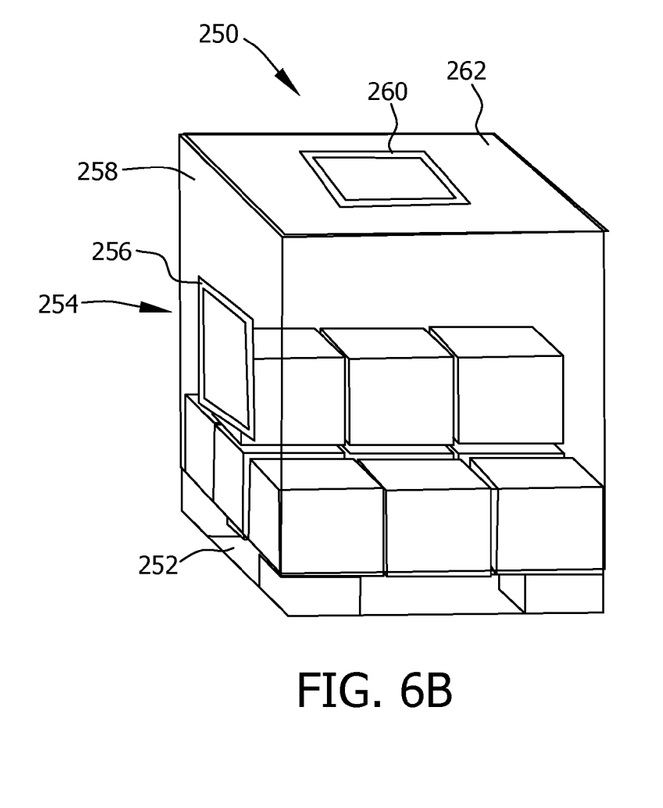
FIG. 6B illustrates schematically how a display, according to FIG. 6B, may be set up in accordance with the principles of the present invention.

FIG. 6A is a perspective view of a POP display 250, such as may be used in retail environments, such as bulk "shopping clubs", in which a bulk bin, typically incorporating a supporting pallet structure 252, is simply opened on the front or top to enable access to the product therein. One example of a pallet structure, having a collapsible bulk bin affixed thereto, is illustrated in U.S. Pat. No. 5,934,474, the complete disclosure of which is incorporated herein by reference.

FIG. 6A is a perspective, simplified or schematic view of POP display 250, according to the principles of the present invention, incorporating a shipping pallet 252 into the structure of the display 254. POP display 250 includes antenna 256 on side wall 258, and antenna 260 on top wall 262. Upon delivery, the front wall may be removed, to permit access to the packages 264. The reader, display and associated electronics and electrical connections are not shown but are understood to be present.

Each of the POP displays discussed herein may be provided with LED or LCD displays that could be connected to the onboard computer, or to the store computer, to provide static or interactive information, e.g., product use suggestions, nutritional information and the like, to prospective consumers.

With respect to the RFID technology to be used, the tags (not shown) to be attached to or embedded within the products to be tracked can be any of those commercially available. There are three kinds of tags: active, passive and semi-passive. Active RFID tags are battery powered in order to transmit a signal to a reader, and are generally used for high-value goods that need to be tracked over long ranges (100 feet or more). Active tags are usually more expensive than passive tags. Passive RFID tags are not battery powered, and instead draw power from electromagnetic waves given off by an RFID reader. The read range for passive tags is usually 10 feet or less, and such tags are relatively inexpensive (less than $1 US). Passive tags require no maintenance, and are primarily intended to track items at the pallet, case and individual levels. Semi-passive tags are similar to active tags in that they have batteries, but the battery is only used to run the microchip circuitry in the tag, not to power communications with a reader. These tags are typically priced more than $1 US and are generally used for tracking relatively high-value goods, with longer read ranges, than passive tags. While actively transmitting (and semi-passive) tags may be employed, most preferred are passive tags that are energized by the interrogating source (the antenna and reader within the POP display).

Many RFID protocols exist and others are under proposal, including a protocol which is believed will be known as EPC. Examples of RFID protocols that can be used include:

ISO 14443 (A/B)
ISO 15693
Philips I-Code
TI Tag-It
Micro-ID 350/450
Checkpoint Performa
Alien EPC Class 1
Matrics EPC Class 0
ISO 18000-4 (A/B)
ISO 18000-6 (A/B)
EM Micro EM4022/4222
Philips I-Code HSL
SCS Dura-Label
Intermec Intellitag
BiStar SuperTag Any frequency that is currently used for RFID can be used; for example, HF (13.56 MHz), UHF (915 MHz or 868-950 MHz) and microwave (2.45 GHz) are particularly suitable for passive tags and 433 MHz is preferred for active tags.

Suitable RFID tags can be obtained from a number of sources, including Alien Technology of Morgan Hill, N.J.; Matrics, of Columbia, Md.; Philips Semiconductors of Gratkorn, Austria; KSW of Dresden, Germany; Sokymat of Granges, Switzerland; RFSAW of Richardson, Tex. and Hitachi and Maxell, of Japan.

The antennas attached to the display can be simple 50 ohm loop antennas or more complex constructions, including multiplex arrangements, such as are known in the art of RF technology. The readers can be any suitable reader apparatus, including those available from Alien Technology; Matrics; Philips Semiconductors; Applied Wireless Identifications Group (AWID) of Monsley, N.Y.; Feig Electronic GmbH of Germany; EM Microelectronics of Marin, Switzerland; Markem, Intermec, and Dainippon Printing of Japan; Mitsubishi Materials of Japan; Texas Instruments of Piano, Tex.; Thingmagic LLC of Cambridge, Mass.; Tyco Sensormatic, Checkpoint, and SAMSys of Toronto, Calif.; Tagsys of France, etc.

As mentioned, the antennas may be optionally directly printed onto the floor, shelf or wall of the POP display before assembly. Alternatively, the antenna(s) may be hidden, e.g., with a false ceiling wall or floor in the display. Cables and other leads may be embedded within the structure of the corrugated board, placed within folds between wall panels, and so on.

The data from the reader incorporated into the POP display can be stored locally, e.g., on a PDA (personal digital assistant) or laptop computer. Alternatively, the data can be transmitted either wirelessly or by wired connections to a remote computer. The data generated by the reader can alternatively be displayed directly on a monitor attached to the POP display. Similarly, information associated with the tag, e.g., product information, recipes, use hints, nutritional information, etc., can be displayed on the monitor.

The foregoing description and drawings merely explain and illustrate the invention, and the invention is not limited thereto, except as those skilled in the art who have the present disclosure before them will be able to make modifications and variations therein without departing from the scope of the invention.

The invention claimed is:

1. A system for monitoring inventory in a point of purchase display, comprising:
   a portable display stand, having a display area including at least one shelf, operably configured to support an article being displayed for sale thereon, the portable display stand configured to be collapsible;
   the display stand further having at least one of a bottom wall, a side wall, a back wall, a top wall, a front wall, wherein the at least one bottom wall, side wall, back wall, top wall and front wall being fabricated at least in part from corrugated paperboard comprising a plurality of layers of paper;
   at least one article being displayed for sale within the display area, said article operably configured to be positioned on the at least one shelf,
   the at least one article containing a radio frequency identification tag;
   a single radio frequency antenna embedded within the corrugated paperboard between juxtaposed layers of paper;
   a radio frequency identification tag reader, operably connected to the radio frequency antenna, for transmitting to and receiving radio frequency signals from the radio frequency identification tag, the radio frequency identification tag reader being operably configured to interrogate any radio frequency identification tags located within the display area,
   the radio frequency identification tag reader being operably connectable to a remotely situated monitoring apparatus, for providing a remote indication of the presence and absence of the at least one article containing the radio frequency identification tag, within the display area.

2. The system according to claim 1, wherein the portable display stand is fabricated from at least one of: paper, paperboard, corrugated paperboard, bristol board, foam cored board, and plastic.

3. The system according to claim 1, wherein the portable display stand is at least partially covered with emf absorbing/shielding material.

4. The system according to claim 1, wherein the at least one radio frequency antenna is printed with metallic ink on one of the layers of paper.

5. The system according to claim 1, wherein the portable display stand is provided with wheels to facilitate movement of the portable display stand.

6. The system according to claim 1, wherein the portable display stand comprising a bulk bin on a pallet structure, the bulk bin comprising at least a bottom wall, a back wall, a front wall, and a pair of side walls, at least one of the walls is removable for accessing the at least one article therein.

7. A system according to claim 1, wherein said monitoring apparatus is configured to maintain a running inventory of a plurality of articles positioned on the at least one shelf.

8. A system according to claim 7, wherein said monitoring apparatus is configured to communicate the running inventory to an inventory computer.

9. A system in accordance with claim 1 wherein the radio frequency identification tag reader is positioned adjacent the bottom wall of the portable display stand.

10. A system in accordance with claim 1 wherein the radio frequency identification tag reader is positioned adjacent a bottom surface of the at least one shelf of the portable display stand.

11. A system for monitoring inventory in a point of purchase display, comprising:
    a portable display stand, having at least one shelf, operably configured to support an article being displayed for sale positioned thereon, the portable display stand substantially fabricated from paperboard comprising a plurality of layers of paper, the display stand further comprising at least one of a bottom wall, a side wall, a back wall, a top wall, a front wall;
    at least one article being displayed for sale, said article operably configured to be positioned on the at least one shelf, the at least one article containing a radio frequency identification tag;
    at least one radio frequency antenna embedded within the paperboard between juxtaposed layers of paper of at least one of the bottom wall, the side wall, the back wall, the top wall, and the front wall; and
    a radio frequency identification tag reader, operably connected to the at least one radio frequency antenna, for transmitting to and receiving radio frequency signals from the radio frequency identification tag, the radio frequency identification tag reader being operably configured to interrogate any radio frequency identification tags located within the display stand,
    the radio frequency identification tag reader being operably connectable to a remotely situated monitoring apparatus, for providing a remote indication of the presence and absence of the at least one article containing a radio frequency identification tag, within the display.

12. A system according to claim 11, wherein the display stand is configured as a shipping container for carrying a plurality of articles to the point of purchase, said front wall being at least one of integrally formed with at least one of the bottom wall, the side wall, and the top wall, and detachably coupled to at least one of the bottom wall, the side wall, and the top wall wherein the front wall is configured to be at least partially moved to display the at least one article for sale.

13. A system for monitoring inventory in a point of purchase display, the inventory including at least one article being displayed for sale having a radio frequency identification (RFID) tag attached thereto, the system comprising:
a portable display stand, having at least one shelf, operably configured to support the at least one article thereon, the portable display stand configured to be collapsible, the portable display stand further comprising at least one of a bottom wall, a side wall, a back wall, a top wall, and a front wall, wherein at least the back wall comprises a plurality of layers, each layer fabricated from at least one of a foam core, paperboard, and corrugated paperboard; and
at least one radio frequency (RE) antenna embedded between juxtaposed layers of the back wall, wherein the at least one RF antenna is configured to:
receive RF energy from an RFID reader;
transmit RF energy to interrogate the RFID tag attached to the at least one article positioned on any of the at least one shelf; and
receive an RE signal from the interrogated RFID tag, the received RF signal indicating a presence of the at least one article within the portable display stand.

14. A system according to claim 13, wherein the portable display stand is substantially fabricated from corrugated paperboard having a fluted paperboard layer positioned between an interior paperboard layer and an exterior paperboard layer, wherein the at least one RF antenna is embedded within flutes of the fluted paperboard layer.

15. A system according to claim 13, wherein the RF antenna is communicatively coupled to the RFID reader by at least one wire.

16. A system according to claim 15, wherein the at least one wire is printed on the portable display stand.

17. A system according to claim 13, wherein the portable display stand is shipped to a destination in a folded flat configuration and erected at the destination.

18. A system according to claim 13 further comprising an inventory computer communicatively coupled to said radio frequency identification tag reader, said radio frequency identification tag reader configured to continuously interrogate said RFID tags, said inventory computer configured to decrement a running inventory of articles when one of the at least one articles is removed from the at least one shelf and to increment the running inventory of articles when an articles is positioned on the at least one shelf.

19. A system for monitoring inventory in a point of purchase display, comprising:
a portable display stand comprising corrugated paperboard configured to be collapsible, the display stand including a plurality of shelves configured to support an article being displayed for sale thereon, the display stand further comprising a back wall opposing an open display front, the corrugated paperboard having a fluted paperboard layer positioned between an interior paperboard layer and an exterior paperboard layer;
a single radio frequency antenna embedded within flutes of the fluted paperboard layer;
a radio frequency identification tag reader, operably connected to the radio frequency antenna, for transmitting and receiving radio frequency signals between the reader and a radio frequency identification enabled article positioned on any of the plurality of shelves; and
a monitoring apparatus communicatively coupled to the radio frequency identification tag reader, the monitoring apparatus positioned remotely from the tag reader and configured to maintain a running inventory of the radio frequency identification enabled articles positioned on any of the plurality of shelves of the portable display stand.

20. A system in accordance with claim 19 wherein the corrugated paperboard display stand is configured to facilitate interrogation of the radio frequency identification enabled article positioned on any of the shelves by the single radio frequency antenna.

* * * * *